United States Patent
Sathyan et al.

(10) Patent No.: US 9,197,996 B2
(45) Date of Patent: Nov. 24, 2015

(54) TRACKING LOCATION OF MOBILE DEVICE IN A WIRELESS NETWORK

(75) Inventors: Thuraiappah Sathyan, Mawson Lakes (AU); Mark Hedley, Sydney (AU)

(73) Assignee: Commonwealth Scientific and Industrial Research Organisation, Campbell, Australian Capital Territory (AU)

( * ) Notice: Subject to any disclaimer, the term of this patent is extended or adjusted under 35 U.S.C. 154(b) by 101 days.

(21) Appl. No.: 13/885,881

(22) PCT Filed: Jan. 11, 2012

(86) PCT No.: PCT/AU2012/000018
§ 371 (c)(1),
(2), (4) Date: Jul. 13, 2013

(87) PCT Pub. No.: WO2012/065233
PCT Pub. Date: May 24, 2012

(65) Prior Publication Data
US 2014/0045518 A1    Feb. 13, 2014

(51) Int. Cl.
*H04W 4/00* (2009.01)
*H04W 4/02* (2009.01)

(52) U.S. Cl.
CPC ....................................... *H04W 4/023* (2013.01)

(58) Field of Classification Search
USPC ...................... 342/52–53, 107, 173; 375/136; 702/150, 181
See application file for complete search history.

(56) References Cited

U.S. PATENT DOCUMENTS

| | | | |
|---|---|---|---|
| 6,502,082 B1 * | 12/2002 | Toyama et al. | 706/16 |
| 7,076,259 B2 | 7/2006 | Belcea | |
| 7,199,754 B2 * | 4/2007 | Krumm et al. | 342/451 |
| 7,263,349 B2 | 8/2007 | Sih et al. | |
| 7,457,860 B2 | 11/2008 | Shang et al. | |
| 7,460,976 B2 | 12/2008 | Ye et al. | |
| 8,373,581 B2 * | 2/2013 | Hassan et al. | 340/992 |

(Continued)

FOREIGN PATENT DOCUMENTS

| | | |
|---|---|---|
| WO | 9953339 A1 | 10/1999 |
| WO | 2006073816 A2 | 7/2006 |

(Continued)

OTHER PUBLICATIONS

Wymeersch et al., Cooperative Bayesian Self-Tracking for Wireless Networks Henk, IEEE Communications Letters, Vol. 12, No. 7, Jul. 2008, pp. 505-507.
Ferner, et al., Cooperative Anchor-less Localization for Large Dynamic Networks, Proceedings of the 2008 IEEE International Conference on Ultra-Wideband (ICUWB2008), vol. 2, pp. 181-185.

(Continued)

*Primary Examiner* — Diane Mizrahi
(74) *Attorney, Agent, or Firm* — Fitch, Even, Tabin & Flannery, LLP

(57) ABSTRACT

A method and system for dynamically tracking the location of mobile nodes (104, 106, 108, 110$_n$) in a wireless network (102) is disclosed. The method comprises: for each mobile node, dynamically measuring the range between the mobile node and at least one neighboring node (step 202); and executing a Bayesian tracking algorithm for each mobile node (step 204). The algorithm has the measured range as an input, exchanges data with tracking algorithms for neighboring mobile nodes, and utilizes a statistical model of error in measured range and a statistical model of node motion to dynamically determine location.

32 Claims, 10 Drawing Sheets

(56) References Cited

U.S. PATENT DOCUMENTS

| | | | |
|---|---|---|---|
| 2008/0232281 A1 | 9/2008 | Pahlavan et al. | |
| 2008/0268873 A1 | 10/2008 | Wymeersch et al. | |
| 2008/0309556 A1 | 12/2008 | Hohl | |
| 2009/0046005 A1 | 2/2009 | Namineni et al. | |
| 2009/0196267 A1 | 8/2009 | Walker, Sr. | |
| 2010/0171642 A1* | 7/2010 | Hassan et al. | 340/992 |
| 2012/0007779 A1* | 1/2012 | Klepal et al. | 342/451 |
| 2014/0012061 A1* | 1/2014 | Song et al. | 600/1 |

FOREIGN PATENT DOCUMENTS

| | | | |
|---|---|---|---|
| WO | 2007093404 | A1 | 8/2007 |
| WO | 2008115209 | A2 | 9/2008 |
| WO | 2008115209 | A3 | 9/2008 |
| WO | 2009021068 | A1 | 2/2009 |
| WO | 2009099773 | A2 | 8/2009 |

OTHER PUBLICATIONS

Wymeersch et al., Cooperative Localization in Wireless Networks, Proceedings of the IEEE I vol. 97,No. 2, Feb. 2009, pp. 428-450.

Ihler et al., Nonparametric Belief Propagation for Self-Localization of Sensor Networks, IEEE Journal on Selected Areas in Communication, vol. 23, No. 4, Apr. 2005, pp. 809-819.

Ihler et al., Nonparametric Belief Propagation for Sensor Self-Calibration, ICASSP, 2004, pp. III-861-III-864.

Ihler et al., Nonparametric Belief Propagation for Self-Calibration in Sensor Networks, pp. 225-233.

Zhang et al., Dynamic Self-Calibration in Collaborative Wireless Networks Using Belief Propagation with Gaussian Particle Filtering, 2007 Conference on Information Sciences and Systems, The Johns Hopkins University, Mar. 14-16, 2007, pp. 771-776.

International Search Report for International Application No. PCT/AU2012/000018 dated Jan. 27, 2012.

International Preliminary Report on Patentability for International Application No. PCT/AU2012/000018 dated May 21, 2013.

* cited by examiner

TRACKING LOCATION OF MOBILE DEVICE IN A WIRELESS NETWORK

CROSS REFERENCE TO RELATED APPLICATIONS

This application is a national phase application of International Application No. PCT/AU2012/000018, filed Jan. 11, 2012, and related to Australia Application No. 2010905143, filed Nov. 19, 2010, both of which are incorporated by reference herein in their entirety.

TECHNICAL FIELD

The invention relates generally to wireless communications, and particularly to methods and apparatus for dynamically tracking the location of mobile devices in a wireless network.

BACKGROUND

There are many applications in which it is desirable to track or locate objects or people, such as: tracking athletes for training or providing event information in real time; tracking emergency services or military personnel in buildings and urban environments; tracking staff, patients, and equipment in hospitals and nursing homes; and tracking staff and equipment in industrial, hazardous or mining environments for safety and automation.

The Global Positioning System (GPS) has been widely used for tracking across a wide range of applications, however there are many situations in which GPS cannot be used due to cost, accuracy, and reliability and availability of GPS signals. For example GPS cannot usually be used for tracking within large buildings or in underground mines. A solution in such cases is to deploy a local positioning system consisting of an infrastructure of anchor nodes at known locations and mobile nodes attached to the objects to track. The location of the mobile nodes can be determined in two or three dimensions through an exchange of radio signals between the mobile nodes and the anchor nodes.

A problem with local positioning systems, particularly in environments with constraints on signal propagation such as buildings and mines, is that the required anchor node density for full site coverage is not practical. Furthermore, the radio communications systems in such environments are frequently ad hoc or mesh networks. The requirements on the anchor nodes can be reduced by using "cooperative localisation". In cooperative localisation, signals are not only exchanged between anchors and mobile nodes, but they are also exchanged between mobile nodes, hence nodes cooperate to determine their location using the network.

Cooperative localisation usually uses distance measurements between communicating node pairs, the distance being estimated from the exchanged radio signals and typically be based on time of arrival or signal strength.

A simple form of cooperative localisation is iterative multilateration. Multilateration is used to determine the locations of mobile nodes with sufficient distance measurements to anchor nodes. The computed mobile nodes are then treated as anchor nodes and this procedure is iterated until no more mobile nodes can be located. Two problems exist with this approach: the error performance is poor, and in many network topologies the location of many of the mobile nodes cannot be estimated by this algorithm.

A need exists, therefore, to provide improved location tracking.

SUMMARY

In one broad form there is provided a method for dynamically tracking the location of mobile nodes in a wireless network comprising:
  for each said mobile node, dynamically measuring the range between said mobile node and at least one neighbouring node; and
  executing a Bayesian tracking algorithm for each mobile node, said algorithm having said measured range as an input, exchanging data with tracking algorithms for neighbouring mobile nodes, and utilising a statistical model of error in measured range and a statistical model of node motion to dynamically determine location.

In another broad form, there is provided a wireless tracking system comprising:
  a plurality of mobile wireless devices, each said mobile device including a transmission circuit for the sending data as radio signals, and a range estimation module for dynamically measuring the range between said device and at least one neighbouring device; and
  a plurality of anchor wireless devices, each said anchor device being at a known location and including a range estimation circuit for dynamically measuring the range between said anchor device and at least one neighbouring device; and
  a Bayesian tracking filter for each said mobile device for receiving said measured range as an input and exchanging data with tracking algorithms for neighbouring mobile nodes, said tracking filter utilising a statistical model of error in measured range and a statistical model of node motion to dynamically determine location.

In a yet further broad form, there is provided a mobile wireless device comprising:
  a transceiver circuit for sending and receiving data to neighbouring said mobile devices;
  a range estimation module for dynamically measuring the range between said device and at least one neighbouring device; and
  a Bayesian tracking filter that receives said measured range as an input and exchanges data with tracking algorithms for neighbouring mobile nodes, and utilises a statistical model of error in measured range and a statistical model of node motion to dynamically determine location.

Further, there is provided a mobile wireless device comprising:
  a range estimation module for dynamically measuring the range between said device and neighbouring devices; and
  a transmitter circuit for sending measured ranges to separate device having a tracking filter for said mobile device.

Advantageously, the method and apparatus combine cooperative localisation with temporal tracking in a Bayesian framework that allows other information to be included in the tracking algorithm. In particular, the tracking method uses a statistical model of the mobile node motion to constrain the node track and uses a statistical model of the error in the measured range/distance between nodes. The use of information about the distribution of measured range/distance error has a beneficial effect on the tracking accuracy, particularly in radio propagation environments (such as indoors and underground) where the range/distance error is biased. Most distance measurement systems will produce some outlier measurements with potentially large errors, and a simplified distance error likelihood function is used in the Bayesian framework that is robust to such outliers. This framework also allows other information to be included such a data from an inertial motion unit or a map of the location.

Conceptually, a tracking filter is used for each mobile node. The computations for this filter can be performed on each mobile node, which has the benefit of allowing the network to scale to arbitrary size, however the computations could be distributed in other ways or centralised. Each tracking filter exchanges information with filters for neighbouring nodes so that mobile node filters have information including the range to and location of neighbouring nodes. The Bayesian framework can make use of the information about the uncertainty in node locations, such as a distribution or covariance, when available. As communication bandwidth is limited when node location distributions are exchanged usually only a simplified model rather than a full two- or three-dimensional array will be exchanged.

A 'locate and track' method uses a locate step to provide a location to the tracking filter. This allows a computationally simple filter to be implemented that is particularly suited to situations where the distance measurement error is approximately Gaussian distributed. A more complex 'direct range fusion' method allows tracking to continue where there are too few range measurements for the location step in the locate and track algorithm, and readily handles non-Gaussian noise. This approach is well suited to complex radio propagation environments such as within buildings and underground.

Compared to existing methods, embodiments of the present invention provide more accurate tracking through the greater use of information about and constraints on the mobile node. This also allows tracking to continue in situations where other methods would lose track, and also provides methods for determining when the track has been lost and for reinitialising the track of the mobile node. The estimation of kinematic parameters of the mobile nodes (such as velocity) that form part of the motion model state can also be estimated.

DETAILED DESCRIPTION

Figure 1:
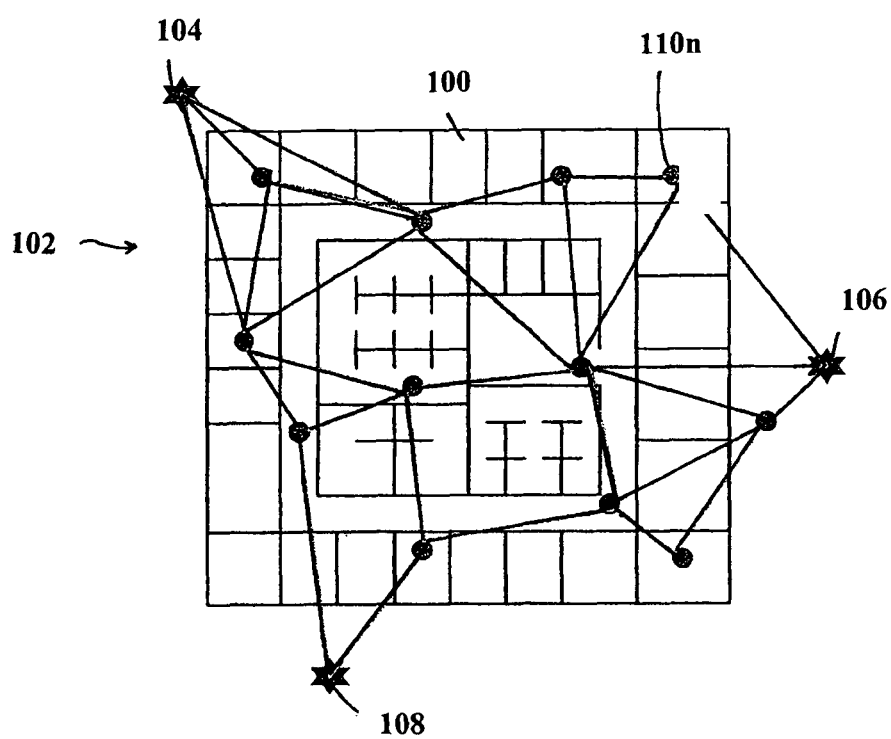
FIG. 1 is an example network in which an embodiment of the invention can be used.

Where reference is made in any one or more of the accompanying drawings to steps and/or features, which have the same reference numerals, those steps and/or features have for the purposes of this description the same function(s) or operation(s), unless the contrary intention appears.

An example application for cooperative tracking is fire fighting. FIG. 1 presents a top-sectional view of a building 100. A network 102 within and around the building 100 includes nodes (shown as stars) 104, 106, 108 representing fire trucks which surround a building 100, with fire fighter nodes 110$_n$ (shown as dots) located inside the building 100. A "node" refers to a device that has wireless communications capability. ("Node" and "device" are used interchangeably.) The fainter lines represent node pairs between which range is measured. There is a need to measure the distance between the nodes. The range measurements between nodes are updated regularly and these measurements are used to track the locations of the nodes as they move. (Note that "range" and "distance" too are interchangeable terms.)

The computations to update the location of the mobile nodes can be distributed or centralised, with the two most common situations being all locations computed on a single computational device within the network (e.g., attached to one of the fire trucks) or location being distributed and calculated on each of the mobile devices. In the example embodiment, the system will be described such that the tracking of each mobile node is distributed and performed within each mobile node, which has the advantage of scaling well with network size. However, it will be understood that there are many other ways in which the computations of range and the method for tracking could equally be distributed or centralised.

Some nodes in the network 102 may have an independent means of determining their location. For example, for the fire trucks 104, 106, 108 outside the building 100 a GPS device could be used to determine their location. In other applications a conventional survey could be used to determine the location of fixed nodes. These nodes are known as the "anchor nodes", and are used to locate the other nodes in the network that are known as the "mobile nodes". Mobile nodes in general do not have an independent means to locating themselves. They make available information about their location and possibly a measure of the reliability of the location. Anchor nodes are often fixed so no tracking is required. A mobile node may include other aids to localisation such as an inertial motion unit or odometry, and this information can be used in the tracking filter for each mobile node.

Figure 2:
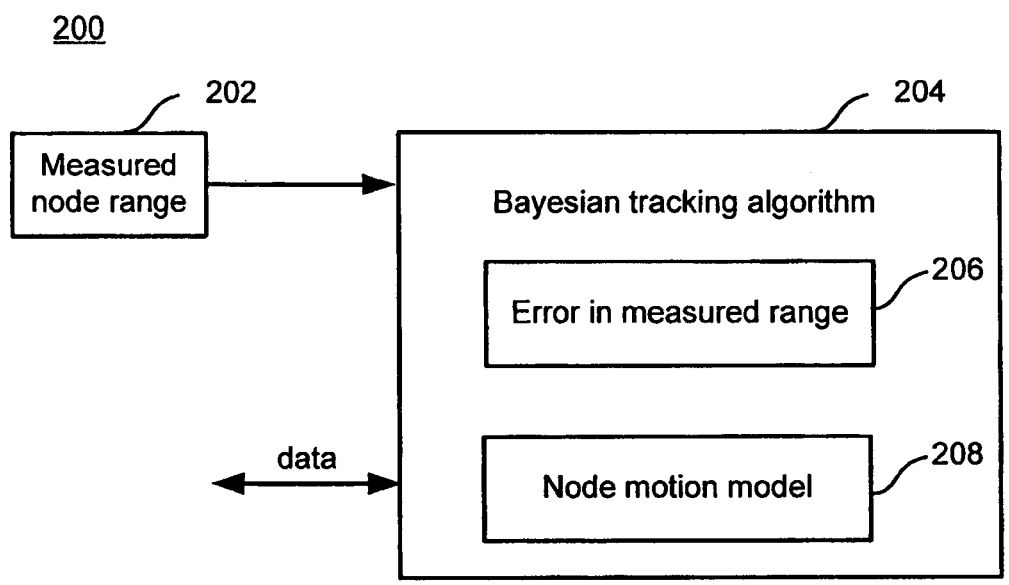
FIG. 2 is a flowchart of the method of the invention in a broad form.

FIG. 2 shows a generalised method 200 for dynamically tracking the location of a mobile node in a wireless network. The method includes, in step 202, dynamically measuring the range between the mobile node and at least one other node. The measured range is provided as an input to a tracking algorithm. The tracking algorithm 204 is Bayesian in nature. The algorithm 204 exchanges data with tracking algorithms for neighbouring mobile nodes, and implements a statistical model of error in measured range 206, and a statistical model of node motion 208 to dynamically determine the mobile node's location. A Bayesian algorithm involves the calculation (usually an approximation) of the probability of the state given all data to date, and uses this to estimate the location.

The terms "neighbour/ing node" includes any two nodes between which range can be measured.

Figure 3:
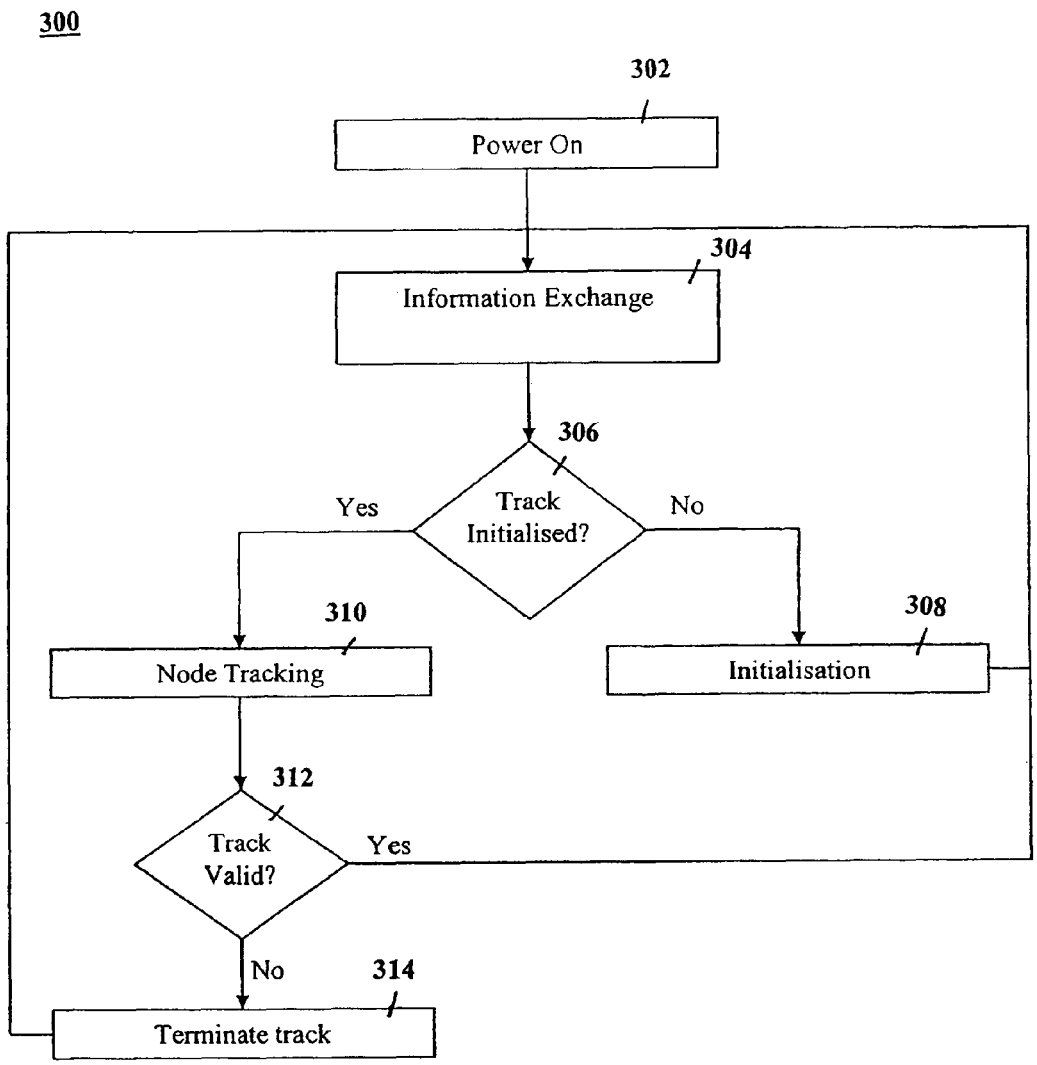
FIG. 3 is a flowchart of an embodiment tracking method.

Referring now to FIG. 3, there is shown a process flow 300. When a mobile node is turned on, in step 302, a process begins to track the location of the node. In general, mobile nodes require cooperation with other nodes in the network to determine their location, and when turned on mobile nodes have no information about their current location. In step 304, through exchanges of radio signals and data, nodes measure the distance to their neighbours, obtain information about the state of their neighbours and send information about their own state to their neighbours. This information is used by the tracking method in each node to update their current state, which includes information about the location of the node and possibly other parameters such as velocity.

A node tracking filter needs to be initialised, in step 308, with information such as an initial estimate of the respective node location. In general, there is no initial estimate of the state parameters at turn on, and the parameters become invalid if the location of the node is unknown. If the track is not initialised, then an initialisation is performed in step 308, else if so, then node tracking begins in step 310. A test is then performed in step 312 of whether the track is valid, and if not, then in step 314 the track is terminated (to begin again).

Information exchange step 304 returns information from all neighbours with which the current node has successfully communicated, which includes the possibility of information obtained from no neighbours or only a few. Is it also possible that a distance estimate to a node is obtained, but that node is not initialised so has no information about its location to send. The neighbour information must include information about the location of a neighbour. The specific information depends upon the details of the node tracking step 310, and such possibilities include coordinates for each node, or mean and covariance of node location estimate, or a distribution (two-dimensional or three-dimensional) for the node location estimate, or a compact representation of the distribution. It may be beneficial to exchange other information such as kinematic parameters for the mobile nodes. The information exchanged can also be about the last tracked location of the node, or a prediction of the node location at a future time.

Where the node tracking filters (i.e., step 310) are distributed in a network due to limited communication bandwidth, it is not generally desirable to exchange a full distribution of node location, so the use of summarised measures such as mean and covariance for a Gaussian model would be preferred in that case. This can also be extended to a Gaussian mixture model. The information exchanged between nodes will be called "exchanged node information" hereinafter. This exchange is applicable to all nodes. Mobile nodes will exchange information from their tracking filters, and anchor nodes will provide their location and may also have an uncertainty in their location (e.g. if a GPS reference, the GDOP can also be sent).

There may be situations where the range and exchanged node information that a particular node filter obtains from its neighbours does not permit the node tracking step 310 to update the current node location. Reasons for this could include insufficient neighbours, neighbours without location information or ill-conditioned data. The node tracking step 310 can predict the current location of the node, however, in the absence of usable measurements, the uncertainty in the node location grows until the estimated location is useless and the track is regarded as lost. When the track is terminated, in step 314, previous state information about the track is discarded and the track is reinitialised when suitable data becomes available. In one example embodiment, a counter is incremented every time the current information is set to the predicted state and the same counter is set to zero when the current information is set to the updated information. If the counter exceeds a predefined threshold, meaning that the node state information has been predicted for long enough, the track is terminated. In another example embodiment, the track quality is evaluated using the log-likelihood track score function. When the track score is lower than a predefined threshold the track is terminated.

Track Initialisation

Initialisation of a mobile node tracking (step 308) requires that an initial location (this could be coordinates or a distribution) for the mobile node is determined. There are often other parameters to be initialised, such as kinematic parameters or estimates of measurement and process noise, which are particular to the tracking method and motion model employed.

A known simple technique is when range measurements to a sufficient number of neighbouring anchor nodes are available through the range and location information exchange with neighbours, in which case a multilateration method such as the well-known iterative least squares algorithm can be used. In the more difficult situation where cooperative localisation is required, such a technique preferably is not used.

In one embodiment of the initialisation step 308, a known DV distance algorithm can be used. In the DV distance algorithm the multi-hop distance from each node to each anchor is determined using a distributed routing algorithm. The estimated multi-hop distance will be greater than the actual distance between the node and the anchors, and in a second phase a correction term is determined and propagated to all nodes. Based on the estimated distance to the each anchor the mobile nodes can use a multilateration algorithm to obtain an initial estimate of its location. An optional refinement step to the DV distance position estimate can be applied, which iteratively updates the node location by exchanging information with neighbours.

One disadvantage of known cooperative localisation algorithms is that they assume that the network has already been formed with all mobile nodes having a multi-hop connection to a minimum number of anchor nodes (three required for two-dimensional localisation). An example where this is not the case is if the fire fighters $110_n$ each arrive in their trucks 104, 106, 108 and are initially in the immediate vicinity of their respective truck. In this case, the initial location for the fire fighters could be the location of the anchor nodes in the truck obtained using GPS. A similar idea is if an uninitialised node passes sufficiently close to a node of known location then that known location is used as the initial location for the uninitialised node.

Node Tracking

Node tracking (step 310) can be viewed as inference on a dynamical system. The objective is to infer the state of the system, which consists of parameters that are not directly observable from noisy measurements. A dynamical system is often defined using two models: a model describing the change of the state with time (called a 'state transition model') and a model that describes the relationship between the state and the measurement (called a 'measurement model'). The term "state" is traditionally used in filtering, and for the purposes of 'tracking', the 'state transition model' is a model of the motion of the node, parameterised by the values in the state (such as location and velocity). In this document the 'state transition model' will be called the 'motion model' to emphasise its purpose, however it will be understood by those skilled in the art that a state transition model can include more than a motion model.

Often the motion and measurement models are available in a probabilistic form to account for disturbances that occur in the real world. Treating the system as a dynamical system, and using temporal information and a motion model, allows more accurate tracking of the node and estimation of kinematic parameters if desired.

Upon receiving a new measurement the state is updated to reflect its new value. With a probabilistic nature of the state-space representation of the dynamical system this process fits ideally in the Bayesian estimation approach. An advantage of using a Bayesian framework is that other information (such as from an inertial motion unit) are readily incorporated.

The problem that is solved is of tracking the state of the nodes in a wireless network from the measurements of range between pairs of nodes. The motion and measurement models can be written, respectively, as $$x_k = f(x_{k-1}) + v_{k-1} \quad (1)$$

$$z_k = h(x_k) + \omega_k \quad (2)$$

where $x_k$ is the state of the node at time k and $z_k$ is a range measurement between a node and one of its neighbours; $v_k$ is the disturbance in the state evolution and $\omega_k$ is the measurement noise. Although these disturbances are shown as additive in equations (1) and (2) for simplicity, it will be apparent that they need not be additive. $f(.)$ is the state transition function and $h(.)$ is the measurement function. These functions can either be linear or nonlinear functions of the state $x_k$.

Motion Model

As is known in the art, by modelling the motion and including the model in the temporal tracking (or filtering) algorithm noise is suppressed and a better quality track is obtained. For highly predictable motion, such as a ballistic trajectory, the motion is well described using the appropriate model and one seeks the model (state) parameters. In most applications, such as tracking people, the motion is more unpredictable and the model acts as a constraint on the motion (e.g. a walking person cannot move 100 m in 1 second) and facilitates estimation of kinematic parameters such as velocity. Several known models suitable for two-dimensional tracking are described below, and it will be apparent that these can be extended to three-dimensional tracking, and how other models may be used in the same tracking framework.

In one example embodiment the state will consist of the position and speed components of the node, i.e., $x_k = [x_k, \dot{x}_k, y_k, \dot{y}_k]^T$, and the motion is modelled in the Bayesian framework using a nearly constant velocity model as $$x_k = F^{CV} x_{k-1} + v_{k-1} \quad (3)$$

where the state transition matrix is given by $$F^{CV} = \begin{pmatrix} 1 & T \\ 0 & 1 \end{pmatrix} \otimes I_2 \quad (4)$$

where T is the period of time elapsed between sampling instances k and k−1, $I_2$ is a two dimensional identity matrix, and ⊗ denotes the Kronecker product. $v_{k-1}$ is the process noise that accounts for the fact that a mobile node, in practice, cannot hold a constant velocity motion with certainty. It is commonly assumed to be Gaussian distributed with zero mean and covariance matrix $Q_{k-1}^{CV}$, given by $$Q_{k-1}^{CV} = q \begin{pmatrix} \frac{T^3}{3} & \frac{T^2}{2} \\ \frac{T^2}{2} & 1 \end{pmatrix} \otimes I_2 \quad (5)$$

where q is the process noise intensity. The nearly constant velocity model given in equation (3) is linear in the assumed state vector.

In another example embodiment, the motion is not adequately modelled using a nearly constant velocity model and a constant acceleration model is used to approximate the state evolution. This model is described mathematically as $$x_k = F^{CA} x_{k-1} + v_k \quad (6)$$

In this case the state consists of the position, velocity, acceleration components, i.e., $x_k = [x_k, \dot{x}_k, \ddot{x}_k, y_k, \dot{y}_k, \ddot{y}_k]^T$. The state transition matrix is given by $$F^{CA} = \begin{pmatrix} 1 & T & \frac{T^2}{2} \\ 0 & 1 & T \\ 0 & 0 & 1 \end{pmatrix} \otimes I_2 \quad (7)$$

and the process noise is assumed zero mean Gaussian distribution whose covariance matrix $$Q_{k-1}^{CA} = q \begin{pmatrix} \frac{T^5}{20} & \frac{T^4}{8} & \frac{T^3}{6} \\ \frac{T^4}{8} & \frac{T^3}{3} & \frac{T^2}{2} \\ \frac{T^3}{6} & \frac{T^2}{3} & T \end{pmatrix} \otimes I_2 \quad (8)$$

The constant acceleration model given in equation (6) is also linear in the assumed state vector.

In applications where a single motion model cannot adequately model the dynamics of the state evolution, it is known that multiple models are used to characterise the state evolution and incorporated in the Bayesian tracking framework. In one example embodiment, two nearly constant velocity models with one having low process noise intensity and the other having high process noise intensity is used to track the state of a maneuvering node.

Measurement Model

The measurement model for tracking in a wireless network using range measurement between the nodes in the network in equation (2) will have the following form $$z_k^i = \sqrt{(x-x_i)^2 + (y-y_i)^2} + \omega_k^i \quad (9)$$

for 2-dimensional tracking, and $$z_k^i = \sqrt{(x-x_i)^2 + (y-y_i)^2 + (z-z_i)^2} + \omega_k^i \quad (10)$$

for 3-dimensional tracking. In the above two equations (x, y, z) denote the position of the node which is updating its state, and $(x_i, y_i, z_i)$ is the position of the neighbour. $z_k^i$ is the range measurement to neighbour node i and $\omega_k^i$ is the measurement noise.

All the measurements from the neighbours can be collected in a vector and represented as $$z_k = h(x_k) + \omega_k \quad (11)$$

where, with N neighbours $$h(x_{k+1}) = \begin{bmatrix} \sqrt{(x_{k+1} - x_{k+1}^1)^2 + (y_{k+1} - y_{k+1}^1)^2} \\ \sqrt{(x_{k+1} - x_{k+1}^2)^2 + (y_{k+1} - y_{k+1}^2)^2} \\ \vdots \\ \sqrt{(x_{k+1} - x_{k+1}^N)^2 + (y_{k+1} - y_{k+1}^N)^2} \end{bmatrix} \text{ and} \quad (12)$$

$$\omega_k = \begin{bmatrix} \omega_k^1 \\ \omega_k^2 \\ \vdots \\ \omega_k^N \end{bmatrix}$$

Figure 4:
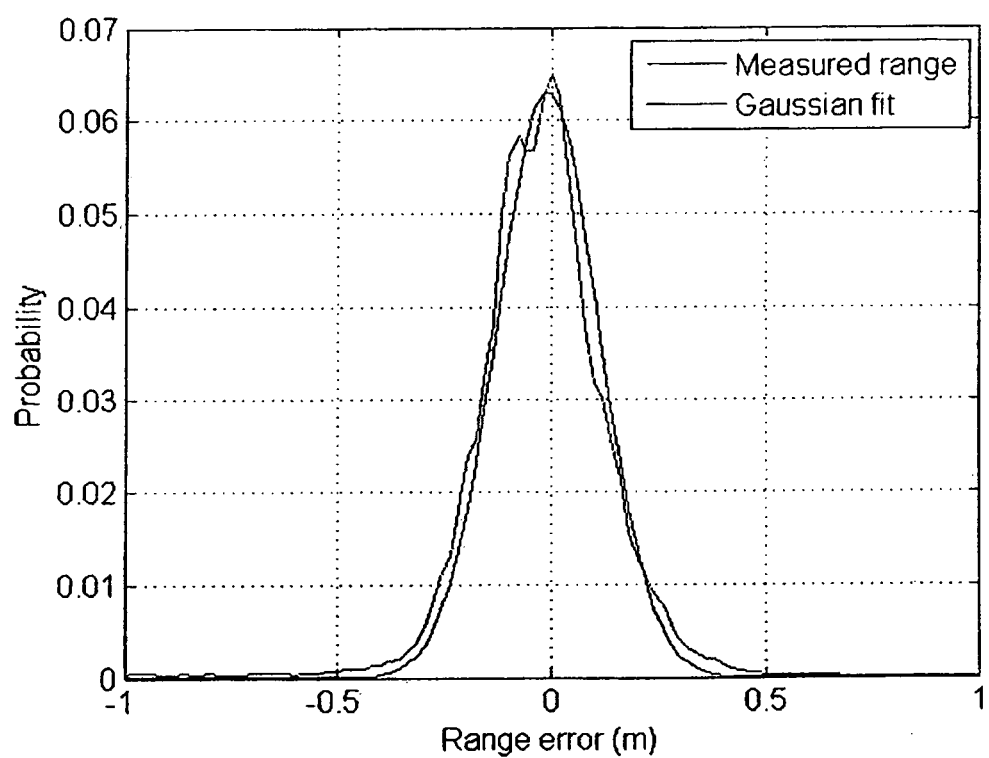
FIG. 4 shows plots of measured range error distribution outdoors and Gaussian approximation.

The characteristic of the (range) measurement error $\omega_k$ is dependent on the environment in which the wireless network is operated. The measured range error distribution in an outdoor environment is shown in FIG. 4, along with a Gaussian approximation. In this environment the range error distribution is unbiased and well approximated by a Gaussian except for a higher probability of outliers.

Figure 5:
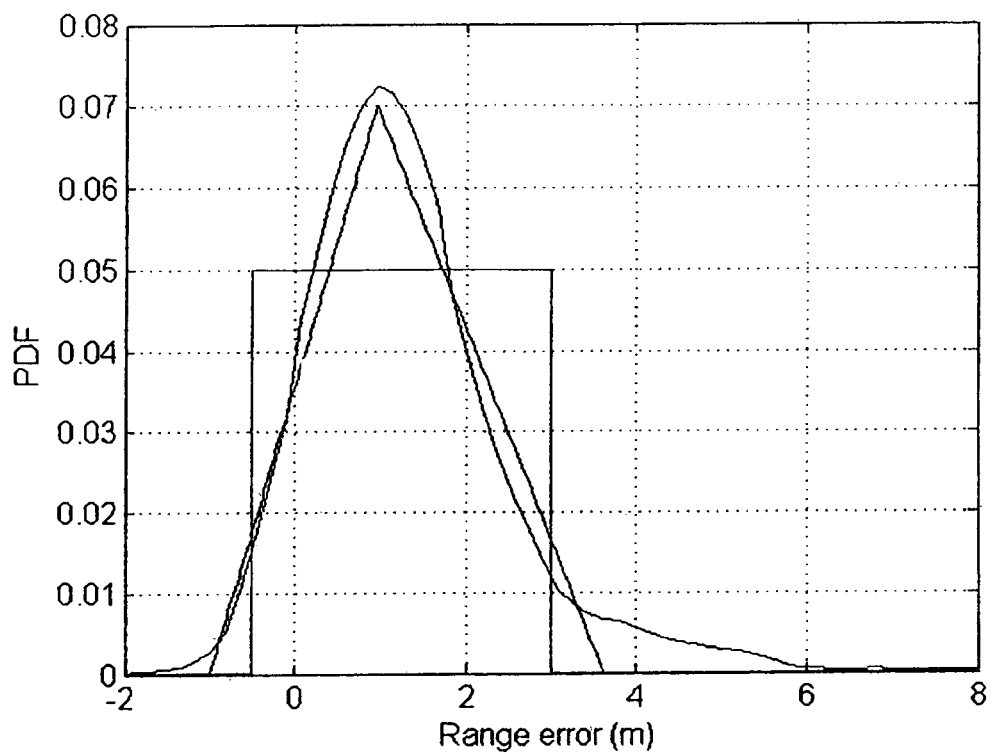
FIG. 5 shows plots of measured range error distribution indoors and simplified likelihood functions.

FIG. 5 shows (in the smooth curve) the measured range error distribution in an indoor office environment, which is clearly biased and non-Gaussian. Most current tracking systems assume a symmetric (and usually Gaussian) distribution for this error, however by using a better model a substantial improvement in the performance of the tracking algorithm can be obtained. The exact range error distribution is not usually known and an approximate distribution is required to be used in the tracking algorithm. The use of a simplified distribution reduces the computational cost for the tracking filter. A rectangular and a triangular approximation to the range error distribution are also shown in FIG. 5. These show the bias in the measurement (range is likely to be overestimated due to the radio propagation environment). A further feature of these approximations is that they to not go to zero but to a small non-zero value outside the main region. This is an advantageous feature to make the tracking algorithm robust to outliers as measurements with very large errors do not have undue influence on the result (such as occurs with least squares techniques). These approximations are not true probability distributions as their integral is not bounded, however they can be considered as likelihoods of range error.

Bayesian Tracking of State

With the state-space model defined as in equations (1) and (2), the optimal Bayesian state estimation continuously updates the conditional posterior density of the state. The optimal Bayesian recursion for the estimation of the state of a node, given the range measurements up to and including sampling time k is given by $$p(x_k | z_{1:k}) = \frac{p(z_k | x_k)}{p(z_k | z_{1:k-1})} \int p(x_k | x_{k-1}) p(x_{k-1} | z_{1:k-1}) dx_{k-1} \quad (13)$$

where $x_k$ is the state of the node at time k, $z_k$ is the set of ranges measurements obtained from all neighbours, and $z_{1:k}$ denotes all the range measurements from all the neighbours for all sampling times up to k. Further, $p(x_{k-1} | z_{1:k-1})$ is the posterior density at time k−1, which is assumed to be available from the previous recursions $p(x_k | x_{k-1})$ is the prior density and $p(z_k | x_k)$ is the likelihood, which can be calculated from the state and measurement models, respectively. The denominator $p(z_k | z_{1:k-1})$ is the normalizing constant of the posterior distribution $p(x_k | z_{1:k})$. The optimal Bayesian recursion is only conceptual and cannot be determined analytically except in special cases.

One special case is the linear-Gaussian state-space model, where both the state and measurement functions are linear, and both the state and measurement noise is Gaussian distributed. In this case a Kalman filter is the optimal minimum mean squared error estimator and presents an analytical approach for the optimal Bayesian recursion. With the assumption of Gaussian noise, the state distribution is Gaussian at any given time, and hence, the Kalman filter propagates sufficient statistics of the state, namely, the mean and covariance.

If the state-space model is nonlinear then the Kalman filter is not directly applicable. The extended Kalman filter (EKF) is a modification of the Kalman filter to handle nonlinear state-space equations. In the EKF the nonlinear state and/or measurement equation is linearised using a first or second order Taylor series expansion. As in the Kalman filter, the EKF assumes a sufficient statistic of mean and covariance for the state, and propagate these through the linearised state-space model.

The unscented Kalman filter (UKF) approximates the state-space distribution using a Gaussian sufficient statistic. Unlike the EKF, the mean and covariance of the state are propagated through the nonlinear system as described by the state-space model, i.e., no linearization is performed. This is achieved by using a deterministic sampling approach in which the state is represented using a carefully chosen sample points.

A relatively recent advancement in nonlinear and non-Gaussian target tracking is the particle filtering technique. Unlike the Kalman filter, or its variants such as EKF or UKF, which assume the sufficient statistic is Gaussian and provides analytical means to propagate the mean and covariance, the particle filter is a sequential Monte Carlo technique that approximates the optimal Bayesian recursion using a point mass representation of the posterior densities. This representation consists of a set of random samples and associated weights. Denote by $\{x_{k-1}^i, w_{k-1}^i\}_{i=1}^N$, the random sample-weight pairs that represent the prior density at time k−1. With the availability of the latest measurement at time k, the particle filter algorithm approximates the posterior density at time k by a new set of random sample-weight pairs $\{x_k^i, w_k^i\}_{i=1}^N$, through sampling and resampling.

The measurement equation for range is non-linear, hence a non-linear filter is required, and where the noise is non-Gaussian the most suitable technique is the particle filter. However, if location is computed for each set of measurements independently (cooperative localisation) then the measurement equation is linear and we can use a simple linear filter to track location. This is termed a "locate and track" method, and the more complex filter based on range is termed the "direct range fusion" method. The locate and track approach is computationally simpler and well suited to simpler applications particularly where the noise is Gaussian distributed. The direct range fusion filter performs better with non-Gaussian noise and allows tracking to continue when there are too few measurements for an independent locate step.

Measurement Validation

An optional step preceding the node tracking step 310 is to validate the range measurements, and remove those that are inconsistent with the system state and presumably erroneous from consideration by the tracking algorithm. This is to prevent range measurement with large errors (outliers) from adversely affecting the tracking performance. In one embodiment, if the measured distance between the node and a neighbour exceeds by a threshold the expected distance (based on either previous or predicted locations) then that distance measurement is rejected as an outlier.

Locate and Track

Figure 6:
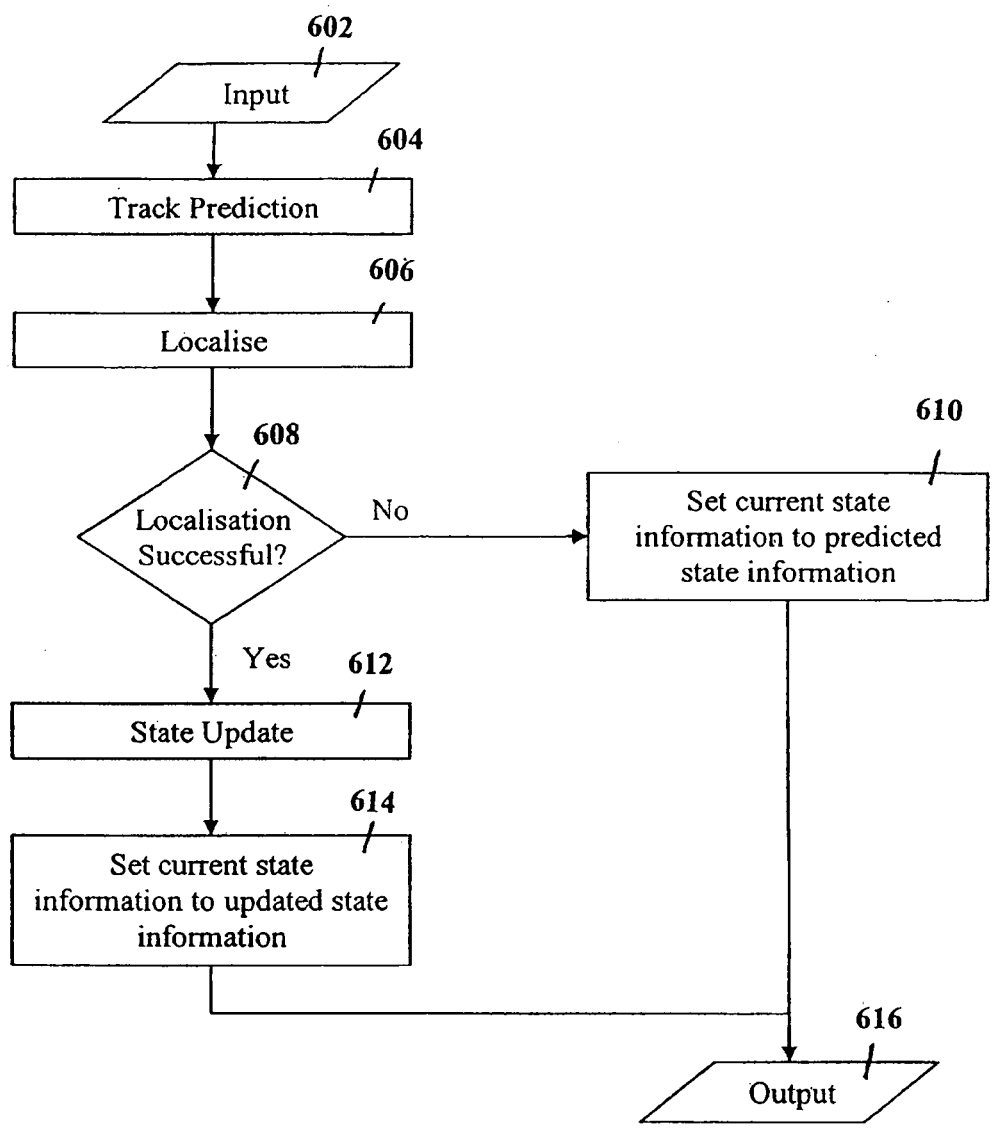
FIG. 6 is a flowchart for node tracking, using a locate and track method.

An example embodiment of the tracking method (step 310 in FIG. 3) is shown in FIG. 6, where the Bayesian filter uses the locate and track method. The input in step 602 holds range and exchanged information for each neighbour. This tracking method first predicts the track of the node in step 604 by applying the prediction step of the filtering algorithm it uses, based on the selected motion model.

After predicting the state information of the node the locate and track method attempts, in step 606, to calculate a new node location using the most-recent set of measurements. This can fail to find a valid solution for a number of reasons including too few measurements, ill-conditioned data or inconsistent data. In step 608, if a new location was not able to be calculated then the current state of the node becomes the predicted state in step 610. If a new location can be computed then, in step 612, the tracking algorithm uses the predicted state and calculated location to update the state information in step 614. The current state is output in step 616.

There are a number of algorithms that can be used for the localisation step 606 of the algorithm. If the range error is Gaussian distributed then the least squares method is well suited to calculate the node location. If the range error is roughly Gaussian distributed but with a large number of outliers, such as measured outdoors and shown in FIG. 4, then the robust least squared algorithm performs well. Where the range error is not approximately Gaussian distributed, such as shown for indoor measurements in FIG. 5, and particularly where it is not symmetric then a Bayesian approach using an approximation of the range error distribution is better. Other localisation algorithms could also be used for this step.

All prior art localisation algorithms assume that the locations of the anchors (i.e. in this case the neighbours act as anchors) are known when performing the localisation. In cooperative tracking, however, the locations of the neighbours are not known exactly, since one only has an estimate of them. Improved tracking performance can be obtained by taking into account the uncertainly in the neighbour locations.

If the distribution of node location (a two-dimensional array for two-dimensional localisation) is exchanged between nodes, then the marginal location distribution of the mobile node can be found from the range error distribution and the location distribution of the neighbours. This is only practical in centralised tracking as the amount of information to be exchanged between neighbours is in general too large. A solution for distributed implementation is to exchange summarised information such as the mean and covariance of the node location. When the range error can be approximated by a Gaussian distribution, the weighted least squares algorithm can be used to localise the node in which the weight given to any particular measurement is determined by the covariance of the estimate of the location of the neighbour.

If the range error distribution is non-Gaussian, then the range error distribution can be adjusted according to the uncertainty in the neighbour location estimate. In one embodiment where a rectangular shaped approximation of the range error is used the width of the base rectangular shape is adjusted according to the uncertainty in the location of the neighbour. That is the possible region where the mobile node could lie is expanded according to the covariance of the location estimate of the neighbour.

The state update step 612 uses the current location measurement to update the current node state. The measurement equation can be written in the two-dimensional tracking case as $$z_k = Hx_k + \omega_k \quad (14)$$

where $z_k$ is the estimate of the node location obtained in the localisation step and $\omega_k$ is the localisation error. If the state $x_k$ consists of position and velocity components of the node, i.e., $x_k = [x_k, \dot{x}_k, y_k, \dot{y}_k]^T$, then H is given by $$H = \begin{bmatrix} 1 & 0 & 0 & 0 \\ 0 & 0 & 1 & 0 \end{bmatrix} \quad (15)$$

The advantage of the locate and track method is that the measurement equation given in (14) is linear in terms of the state $x_k$.

In one embodiment, if the state transition function in (1), i.e., $f(.)$ can be assumed as linear and the state and measurement noise are approximated using Gaussian distributions, then the Kalman filter is used for the state update step 612 and the track prediction step 604.

In another embodiment, if the state transition function is assumed as a nonlinear function and measurement noise are approximated using Gaussian distributions then a nonlinear filtering algorithm, such as the extended Kalman filter or the unscented Kalman filter is used for the state update step 612 and track prediction step 604.

In yet another embodiment, if the state transition function is assumed as a nonlinear function of the state and/or the measurement and/or the state noise is non-Gaussian, then a particle filtering algorithm is used for the state update filter step 612 and the track prediction step 604.

A preferred embodiment of the locate and track approach that is suitable for cooperative tracking in environments with a range error distribution that can be approximated by a Gaussian distribution (possibly with heavy tails), such as typically occurs with line of sight measurements indoors or outdoors, is now described with several variants. In this embodiment the range error model is a Gaussian, the motion model is the nearly constant velocity model, the Kalman filter is used and the localise step uses a robust least squares algorithm so as to minimise the errors caused by outlier range measurements.

In the simplest variant of this embodiment there is a single motion model and the exchanged node information is only node location. The locate step uses the robust least squares algorithm. In a variant of this embodiment the exchanged node information is the mean and covariance of the node location, and a weighted version of the robust least squares algorithm is used to take into account the neighbour location reliability as provided by the covariance.

Figure 7:
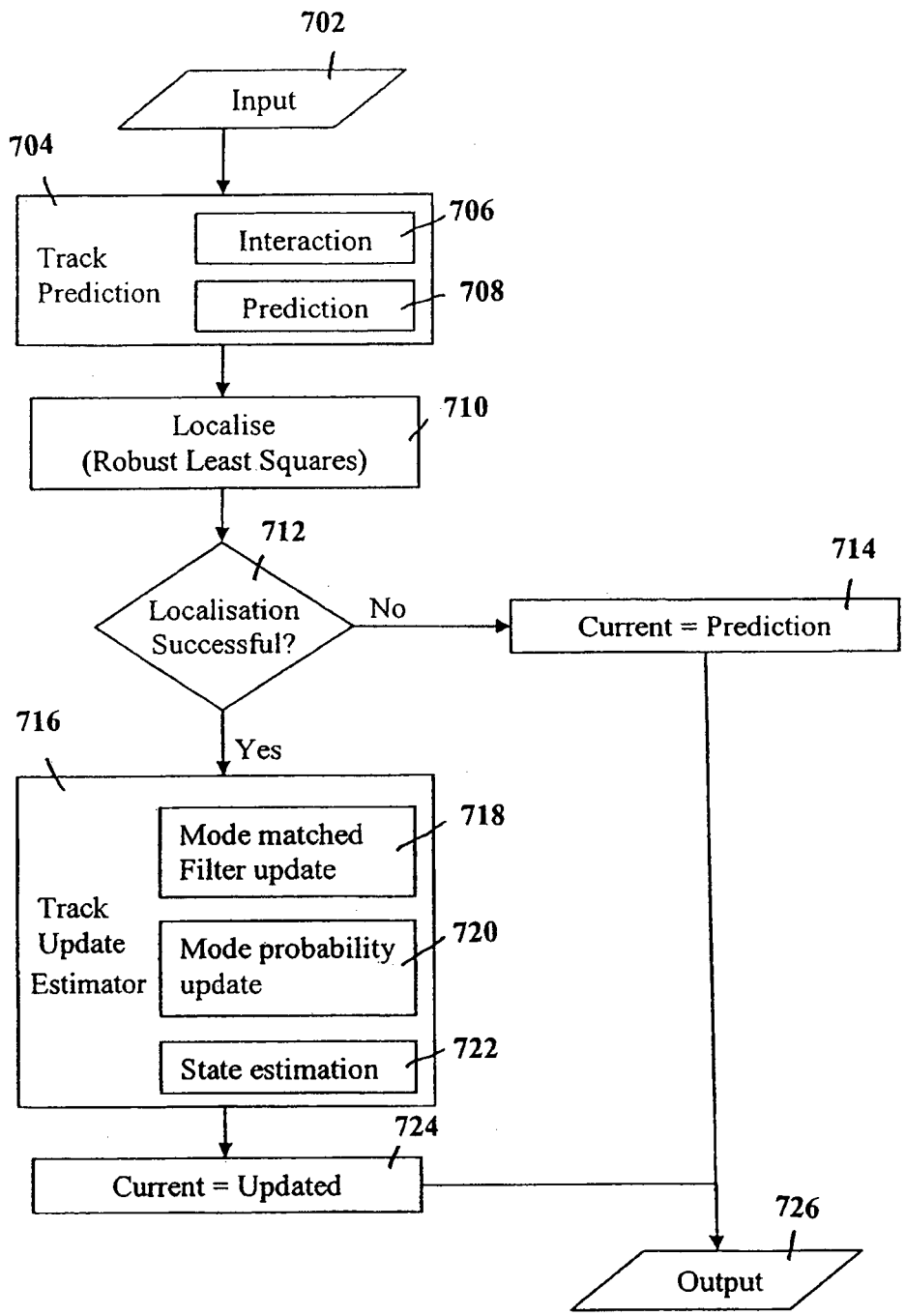
FIG. 7 is an embodiment of the locate and track method for outdoor tracking.

A variant of this embodiment, shown in FIG. 7, is a process 700 that uses the robust least squares algorithm for the localise step and the Interacting Multiple Model (IMM) estimator as the preferred tracking method to update the state of the nodes. The IMM estimator uses multiple Kalman filters, one for each motion model, and determines a probability that each model is active. The steps shown in FIG. 6 are largely in common with those in FIG. 7, with the processing in step 604 shown in more detail in step 704, and the processing in step 612 shown in more detail in step 716.

The input data 702 is used to predict the location of the node in step 708 using each of the Kalman filters, and prior to running the Kalman filter prediction step the IMM interaction step 706 mixes the current states of the Kalman filters as is know in the art of using IMM estimators. Localisation then occurs in step 710 using the robust least squares technique. Step 712 tests whether the localisation was successful. If not, the predicted state, covariance, and model probability is set as the current state, covariance and model probability respectively in the IMM estimator in step 714. If so, then the track is updated using the IMM estimator in step 716 and assigned to the output in step 724. Each Kalman filter produces an updated state estimate in step 718, and the probability that each model is active is updated in step 720. Each node internally propagates a mean and covariance matched to each of the models, and a probability that specifies how likely a particular model is active. The states of the multiple Kalman filters are also combined in step 722 to provide a single estimate of the state of the node. In this embodiment the exchanged node information is the node location and the IMM estimator consists of two nearly-constant velocity models: one with low process noise intensity and the other with high process noise intensity.

Another variant of this embodiment is for the exchanged node information to consist of the mean and covariance of the node location, and a weighted version of the robust least squares algorithm is used for the localise step to utilise the neighbour location covariance.

Direct Range Fusion

Figure 8:
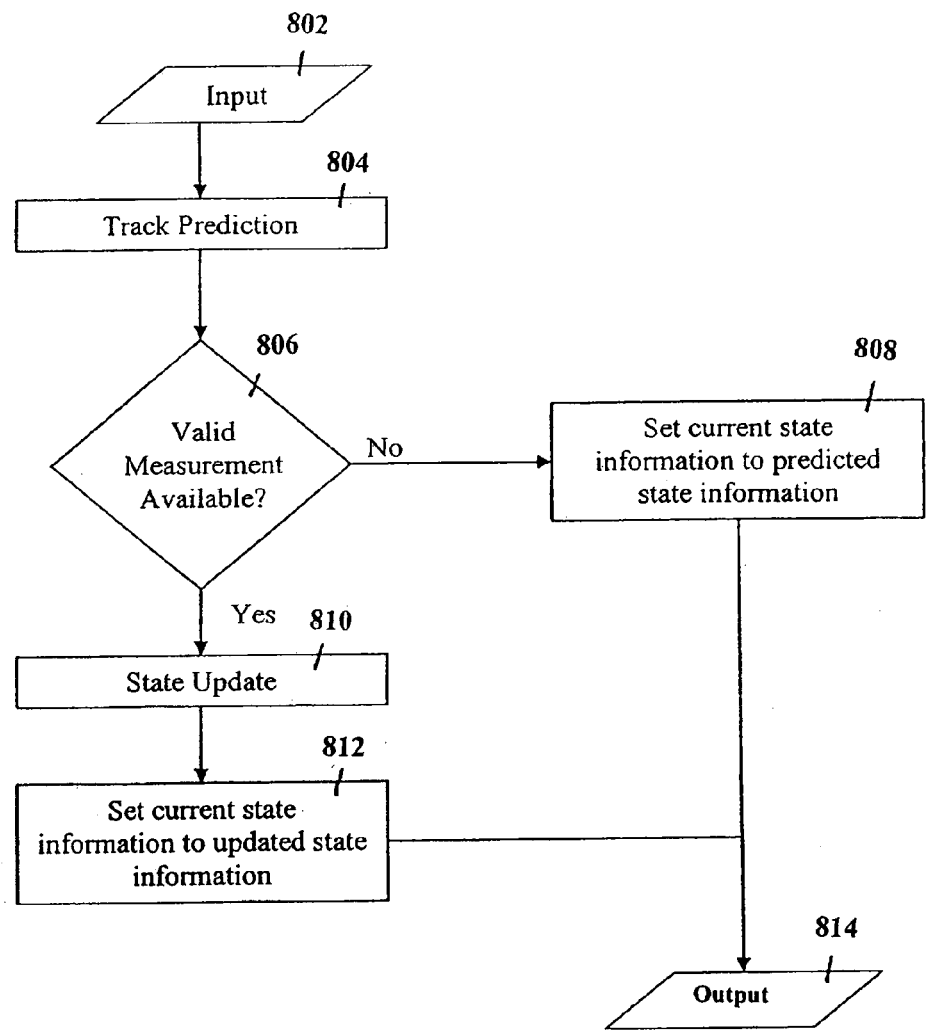
FIG. 8 is a flowchart for node tracking using direct range fusion method.

An embodiment of the tracking method in step 310 of FIG. 3 is shown in the process flow 800 of FIG. 8, where the Bayesian filter uses the direct range fusion method. The input 802 is range and exchanged information for each neighbour node. This tracking method first predicts, in step 804, the track of the node by applying the prediction step of the filtering algorithm it uses, based on the selected motion model. If, in step 806, there are no valid range measurements to a neighbour at a known location then, in step 808, the current state is the predicted state. If there are any valid measurements, then the state update filter uses the measurement to update the current state in step 810. The current state information is set to be the updated state information in step 812. An output is provided in step 814.

The measurement equation for the filtering algorithm in the direct range fusion method is given by equations (11) and (12), since the range information is directly used to update the state. Hence, in the case of direct range fusion method, unlike the locate and track method, the measurement equation is nonlinear. As a result, even if the state equation can be assumed to be linear, a nonlinear filtering algorithm is required.

In one example embodiment, if the state and measurement noise distribution is assumed to be Gaussian, the direct range fusion method uses the extended Kalman filter or the unscented Kalman filter.

In another example embodiment, if the state and/or measurement noise distribution is non-Gaussian a particle filter is used in the direct range fusion method.

As in the locate and track approach, how the uncertainty of the neighbour location is handled is dependent on the choice of the particular filtering. In one embodiment the mean and covariance of the node location is exchanged between the nodes. If the state of the mobile node at time k is $x_k$ and that of its neighbour i is $x_k^i$ and if they are known exactly, then the measured range between these two nodes can be written as $$z_k^i = \|H(x_k - x_k^i)\| + \omega_k^i \quad (16)$$

Since only an estimate of the state of the neighbour node i is available, let the state and covariance received be $\hat{x}_k^i$ and $P_k^i$ respectively (where usually only the location components of these need to be known). Then the measurement equation can be approximated using a first-order Taylor series expansion around the estimate of the neighbour's state as $$z_k^i = \|H(x_k - \hat{x}_k^i)\| + \alpha_i^T(x_k^i - \hat{x}_k^i) + \omega_k^i \quad (17)$$

where $\alpha_i^T$ is the derivative of the measurement function given by $$\alpha_i = \left.\frac{\partial \|H(x_k - x_k^i)\|}{\partial x_k^i}\right|_{x_k = \hat{x}_k^i} \quad (18)$$

Therefore the conditional mean and covariance of the range measurement are given respectively by $\|H(x_k - \hat{x}_k^i)\|$ and $\alpha_i^T P_k^i \alpha_i + \sigma_i^2$, where $\sigma_i^2$ is the variance of the range measurement error. This expansion allows us to view the measurement as $$z_k^i = \|H(x_k - \hat{x}_k^i)\| + \tilde{\omega}_k^i \quad (19)$$

where the measurement error $\tilde{\omega}_k^i$ incorporates the uncertainty in the neighbours location, which has zero mean and covariance $\alpha_i^T P_k^i \alpha_i + \sigma_i^2$. This modified measurement equation is used in the filter as the measurement equation.

This technique is suitable for range measurement errors that can be approximated by Gaussian distributions. If the measurement noise is non-Gaussian and for example, a rectangular distribution is used as the approximate measurement noise distribution, as in the locate and track method, the width of the base shape of the rectangular approximation can be varied according to the covariance of the neighbour location. Such incorporation of the non-Gaussian range error distribution would necessitate the use of a particle filter.

A preferred embodiment of the direct range fusion method that is suitable for difficult radio propagation environments with biased and non-Gaussian measured range error distribution, such as occurs within buildings and underground, is now described with variants. The embodiment uses the nearly constant velocity motion model, particle filter and the triangular likelihood function shown in FIG. 5 is assumed for measurement error model. In one variant of this embodiment the exchanged information consists of node location. In another variant of this embodiment the exchanged information consists of the node location mean and covariance and measurement Equation 19 is used. To do this one could convolve the assumed range error distribution with the Gaussian distribution of the node location error, however a simpler approximation is to stretch the assumed distribution (such as the triangular approximation) by the standard deviation of location error.

Figure 9:
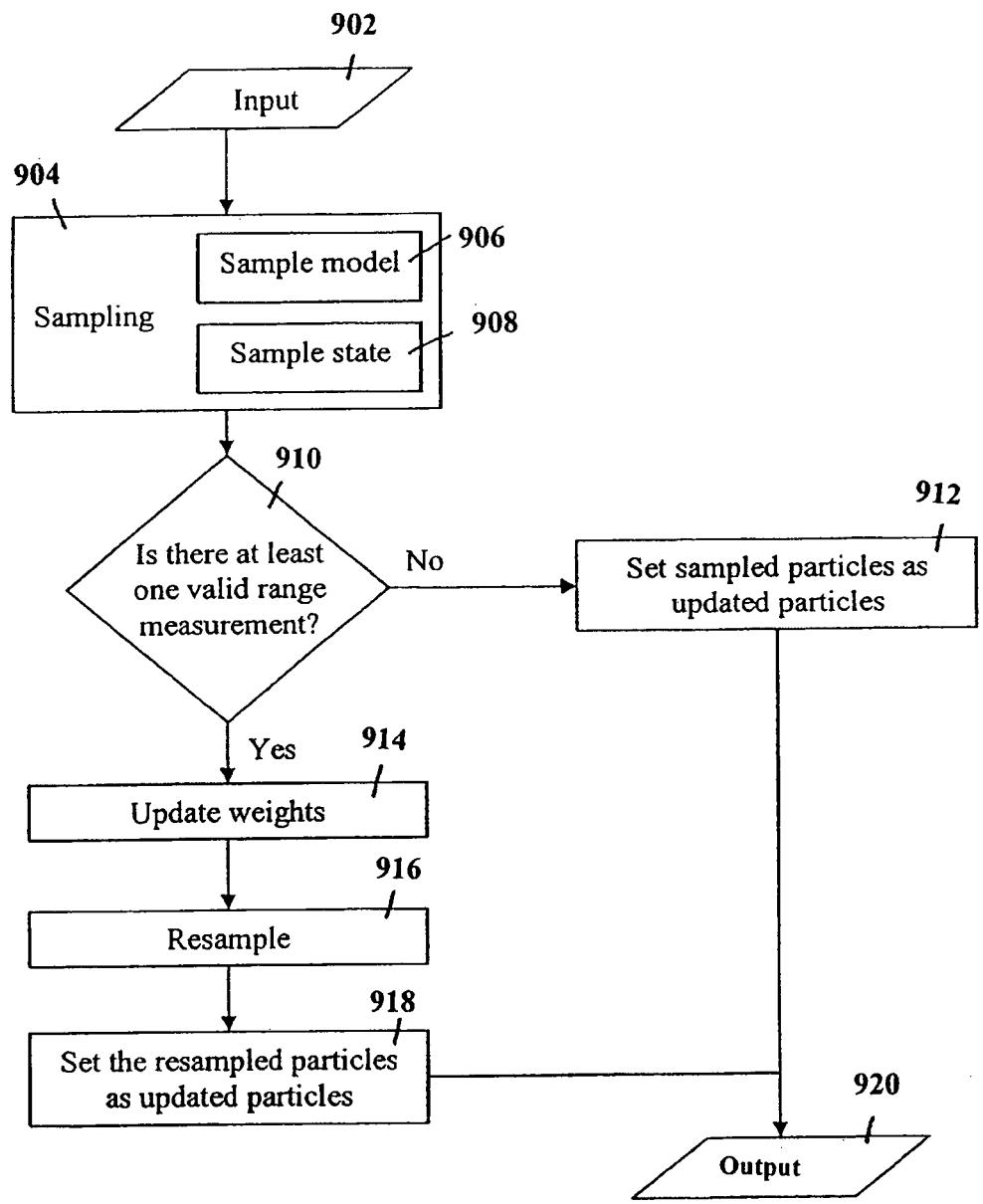
FIG. 9 is an embodiment of the direct range fusion method for indoor tracking.

A variation of this embodiment, shown as the process flow 900 in FIG. 9, is to use multiple motion models with the multiple model particle filter (MMPF) as the preferred Bayesian tracking filter to update the state of the nodes. The MMPF uses two nearly constant velocity models one with a low process noise intensity and the other with a high process noise intensity. This embodiment can use only exchanged node location or exchanged node location mean and covariance with the modified measurement equation as described in the previous paragraph.

The MMPF algorithm first samples the motion model based on a transition probability matrix (TPM). The TPM consists of various probabilities of the possible switch between the different motion models. The (i, j) th element of the matrix is the probability that the model switch from i to j happening, that is, $$p_{ij} = P\{r_k = j | r_{k-1} = i\} \quad (20)$$

where $r_k$ denotes the active model at time k. For example, in one implementation of the preferred embodiment with two motion models the following TPM is used $$TPM = \begin{pmatrix} 0.9 & 0.1 \\ 0.1 & 0.9 \end{pmatrix} \quad (21)$$

Most of the multiple model estimators, including the IMM estimator and MMPF, are not especially sensitive to the exact values of TPM. After sampling of the input 902 in step 904, the motion model state values are sampled in step 906. In the preferred embodiment the prior distribution is used to sample the state in step 908. That is, the i th sample is drawn according to $$x_k^i \sim p(x_k | x_k^i, r_k^i) \quad (22)$$

If, in step 910, there are no range measurements to neighbours available, the preferred embodiment sets the sampled particles as the updated particles with the weights of these particles unmodified in step 912. Otherwise, the weights of the sampled particles are updated using the range error model in step 914. The weight of the i th particle is updated according to $$w_k^i \sim w_{k-1}^i p(z_k | x_k^i) \quad (23)$$

where $p(z_k|x_k^i)$ is the likelihood of the measurement $z_k$, which is obtained from the assumed measurement likelihood. In the preferred embodiment the triangular likelihood function shown in FIG. 5 is assumed for measurement error model. The width is varied according to the error covariance of the neighbouring nodes. The weights are normalised at each iteration of the update weight step so that they sum to unity.

Only a few particles will have non-zero weights after a few measurement updates, which is known as the sample degeneracy problem. This is avoided by resampling the updated particles in step 916; that is, replicating the particles that have higher weights and discarding the particles that have lower weights through a probabilistic selection process in step 918. In the preferred embodiment a known systematic resampling procedure is used, however many other resampling algorithms also be applied. An output is provided in step 920.

Node Hardware

All nodes are transceivers with processing hardware that have the ability to measure range to neighbouring nodes and form a data network. Range can be measured, for example, based on received signal strength (RSS) or time of arrival (TOA) using radio or acoustic signals. One example of a hardware arrangement measuring TOA is given in commonly-owned International Publication No. WO 2010/000036 A1, the entire contents of which are incorporated herein by reference.

Figure 10:
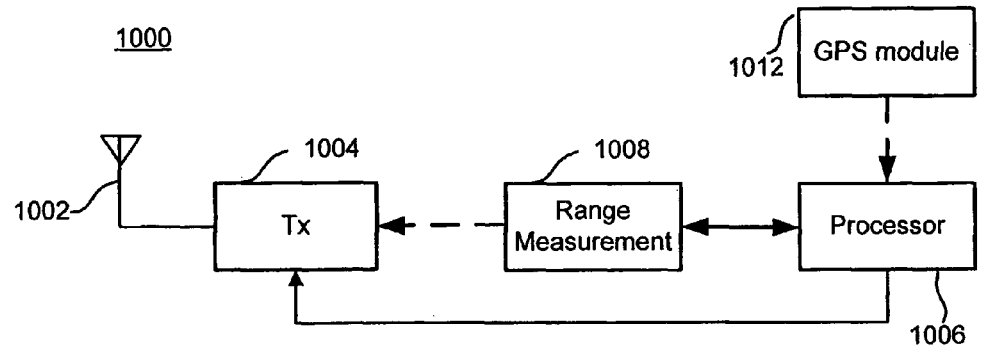
FIG. 10 is a schematic block diagram of an anchor node device.

FIG. 10 is a schematic block diagram of an anchor node device 1000. An antenna 1002 is coupled to a radio frequency transmitter (Tx) circuit 1004 that outputs a data stream from a computational processor 1006 containing information about the node's location and range to neighbouring nodes. Location, in one embodiment, is known from a GPS device 1012 providing such data to the processor 1006. A range measurement module 1008 measures the range to neighbouring devices, and may accomplish this using the transmitter 1004.

Figure 11:
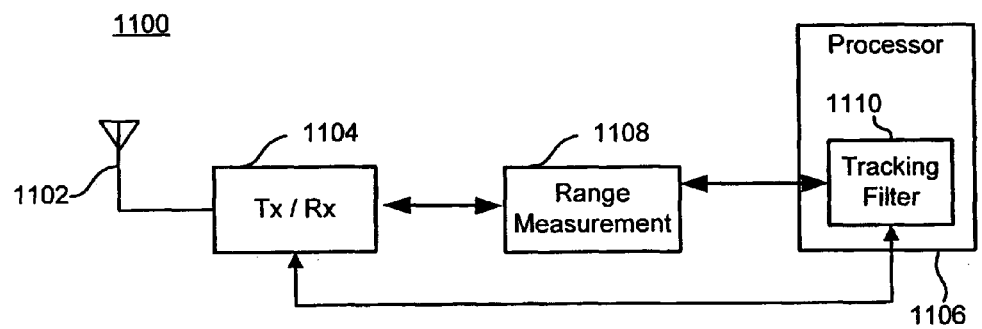
FIG. 11 is a schematic block diagram of a mobile node device.

FIG. 11 is a schematic block diagram of a mobile node device 1100. An antenna 1002 is coupled to a radio frequency transceiver (Tx/Rx) circuit 1104 that provides a received data stream containing information about the node's range to and location of neighbouring nodes to a tracking filter 1110 implemented within a computational processor 1106, and transmits a data stream containing information about itself for use by neighbouring nodes. A range measurement module 1108, in the embodiment, that uses the Tx/Rx circuit 1104, measures the range to neighbouring devices and provides this information to the tracking filter 1110. Location is dynamically determined by the methods described above.

Figure 12:
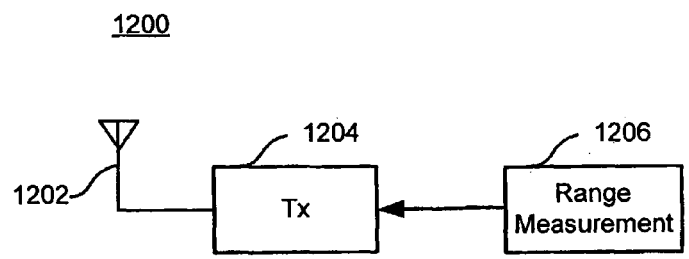
FIG. 12 is a schematic block diagram of another form of mobile node device.

FIG. 12 is a schematic block diagram of another form of mobile node device 1200. The device 1200 has a transmitting antenna 1202, a transmission (Tx) circuit 1204 and a range estimation module 1206, implementing the methods described above. In this arrangement, the device 1200 transmits range measurements to another computational device that executes the tracking filter for said mobile node. Alternatively, the device 1200 transmits range measurements to one of a plurality of access points (not shown), and the tracking filters (not shown) are accessed via said access points.

The invention claimed is:

1. A method for dynamically tracking the locations of mobile wireless devices in a wireless network, the method comprising the steps of:
    dynamically measuring by each mobile wireless device the range between said mobile wireless device and at least one neighbouring wireless device;
    transmitting by each mobile wireless device the respective range to a Bayesian tracking filter; and
    executing, by said Bayesian tracking filter, a Bayesian tracking algorithm for each mobile wireless device, said algorithm having said measured range as an input, exchanging data with tracking algorithms for neighbouring mobile wireless devices, and utilising a statistical model of error in measured range and a statistical model of wireless device motion to dynamically determine location.

2. The method of claim 1, wherein said tracking algorithm determines location using a current data set and temporal tracking.

3. The method of claim 2, wherein said data includes wireless device location distribution information and said tracking algorithm uses a weighted least squares calculation to determine location.

4. The method of claim 3, wherein said tracking algorithm is implemented as a Kalman filter or interacting multiple models.

5. The method of claim 4, wherein said model of wireless device motion is nearly constant velocity.

6. The method of claim 1, wherein said tracking algorithm determines location directly using range measurements to neighbouring wireless devices and said range error model.

7. The method of claim 6, wherein said data includes location information and an uncertainty measure, and said tracking algorithm uses the range error model modified by neighbour wireless device location variance to determine location.

8. The method of claim 7, wherein said tracking algorithm is implemented as a particle filter or as interacting multiple model particle filters.

9. The method of claim 8, wherein said model of wireless device motion is nearly constant velocity.

10. The method of claim 1, wherein said statistical model of error in measured range is a likelihood function with constant positive value beyond the region of support, a plurality of motion models are used, and said wireless devices transmit data to an access point, and said tracking algorithm for at least some of said mobile wireless devices is executed via said access point.

11. The method of claim 1, wherein said neighbouring wireless devices each transceive data from each other, from which range is measured and location is determined, and wherein each said tracking algorithm is implemented on a respective said wireless device.

12. A wireless tracking system comprising:
a plurality of mobile wireless devices, each said mobile device including a transmission circuit for the sending data as radio signals, and a range estimation module for dynamically measuring the range between said device and at least one neighbouring device; and
a plurality of anchor wireless devices, each said anchor device being at a known location and including a range estimation circuit for dynamically measuring the range between said anchor device and at least one neighbouring device; and
a Bayesian tracking filter for each said mobile device for receiving said measured range as an input and exchanging data with tracking algorithms for neighbouring mobile nodes, said tracking filter utilising a statistical model of error in measured range and a statistical model of node motion to dynamically determine location.

13. The system of claim 12, wherein each mobile wireless device includes computational circuitry to implement the respective tracking filter, and said transmitter circuit additionally operates as a transceiver for exchanging data with neighbouring mobile devices.

14. The system of claim 13, wherein said tracking filters directly determine location using range measurements to neighbouring modes.

15. The system of claim 14, wherein said data includes location information and said tracking filters use the range error model directly or modified by neighbour node location variance to determine location.

16. The system of claim 15, wherein said tracking filters are implemented as particle filters or as interacting multiple model particle filters.

17. The system of claim 16, wherein said model of node motion is nearly constant velocity, wherein said model of error in measured range is a likelihood function with constant positive value beyond the region of support, and wherein a plurality of motion models are used in each tracking filter.

18. The system of claim 13, wherein each said tracking filter determines location using a current data set and temporal tracking.

19. The system of claim 18, wherein said data includes location distribution information and said tracking filters use a weighted least squares calculation to determine location.

20. The system of claim 19, wherein said tracking filters are implemented as a Kalman filter or as interacting multiple models.

21. The system of claim 20, wherein said model of node motion is nearly constant velocity.

22. The system of claim 12, wherein each mobile wireless device transmits range measurements to another computational device that executes the tracking filter for said mobile node and wherein each mobile wireless device transmits range measurements to one of a plurality of access points, and wherein said tracking filters are accessed via said access points.

23. A mobile wireless device comprising:
a transceiver circuit for sending and receiving data to neighbouring said mobile devices;
a range estimation module for dynamically measuring the range between said device and at least one neighbouring device; and
a Bayesian tracking filter that receives said measured range as an input and exchanges data with tracking algorithms for neighbouring mobile nodes, and utilises a statistical model of error in measured range and a statistical model of node motion to dynamically determine location.

24. The device of claim 23, wherein each said tracking filter determines location using a current data set and temporal tracking.

25. The device of claim 24, wherein said data includes location distribution information and said tracking filters use a weighted least squares calculation to determine location.

26. The device of claim 25, wherein said tracking filters are implemented as a Kalman filter or as interacting multiple models.

27. The device of claim 26, wherein said model of node motion is nearly constant velocity.

28. The device of claim 23, wherein said tracking filters directly determine location using range measurements to neighbouring modes.

29. The device of claim 28, wherein said data includes location information and said tracking filters use the range error model directly or modified by neighbour node location variance to determine location.

30. The device of claim 29, wherein said tracking filters are implemented as particle filters or interacting multiple model particle filters.

31. The device of claim 30, wherein said model of node motion is nearly constant velocity, wherein said model of error in measured range is a likelihood function with constant positive value beyond the region of support, and wherein at least two motion models are used in each tracking filter.

32. A mobile wireless device comprising:
a range estimation module for dynamically measuring the range between said device and said neighbouring devices; and
a transmitter circuit for sending measured ranges to a separate device having a Bayesian tracking filter for said mobile device, said Bayesian tracking filter utilising a statistical model of error in measured range and a statistical model of node motion to dynamically determine a location of said mobile device.

* * * * *